E. E. SLAUGHTER.
PROCESS OF EXTRACTING METAL FROM SOLUTIONS.
APPLICATION FILED JAN. 6, 1908.
1,001,466.
Patented Aug. 22, 1911.
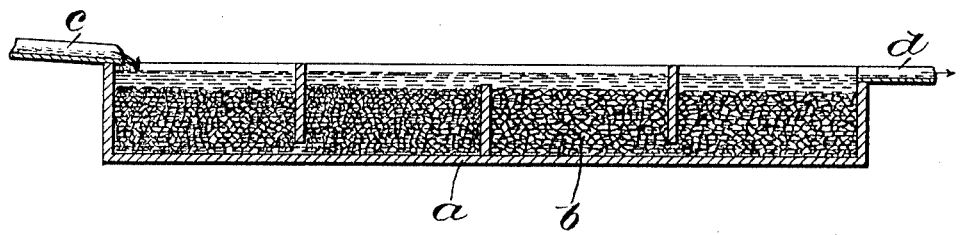

UNITED STATES PATENT OFFICE.

ELMER E. SLAUGHTER, OF CLIFTON, ARIZONA TERRITORY, ASSIGNOR TO WILLIAM L. AUSTIN, OF RIVERSIDE, CALIFORNIA.

PROCESS OF EXTRACTING METAL FROM SOLUTIONS.

1,001,466. Specification of Letters Patent. Patented Aug. 22, 1911.

Application filed January 6, 1908. Serial No. 409,410.

*To all whom it may concern:*

Be it known that I, ELMER E. SLAUGHTER, a citizen of the United States, residing in Clifton, in the county of Graham and Territory of Arizona, have invented an Improvement in Processes of Extracting Metal from Solutions, of which the following description, in connection with the accompanying drawings, is a specification, like letters on the drawings representing like parts.

The present invention relates to a process of extracting metals from metal-bearing substances, and is embodied in a process of extracting metallic copper from solutions such, for example, as mine waters in copper mines. It has been the practice to extract some of the copper from such solutions by allowing the solutions to flow over or come in contact with scrap iron, which results in the extraction of the copper in the form of a copper slime, which requires a long and careful manipulation before the copper can be run into bars. Furthermore, a large amount of iron is consumed in this process in proportion to the amount of copper extracted.

I have discovered that copper can be more rapidly precipitated from solutions and in a better form for subsequent treatment by using in conjunction with iron another substance which is an electrical conductor, and which is either substantially insoluble in the solutions under treatment, or, if soluble or partially soluble, does not produce any effect which is detrimental to the economical recovery of the metallic copper. When the two substances are immersed in the solution together, it is found that metallic copper is precipitated on both substances. Furthermore, the consumption of iron, in proportion to the amount of copper recovered, is greatly diminished. I attribute the result to an electrolytic action in which the iron and the other conducting substance act as electrodes and the solution as the electrolyte. I believe carbon to be the most desirable substance to use in conjunction with the iron, and coke to be the most desirable form of carbon. Moreover, while there is a material advantage over prior processes whenever the two substances are immersed in the solution, whether in the form of large pieces or small, connected by wire, in actual contact, or in communication solely through the solution, I have thus far obtained the best results by using comminuted coke closely packed in with small pieces of iron, the pieces of the two substances being small enough to insure good contact with each other. The copper is precipitated in metallic form, the resultant mass consisting mainly of metallic copper and copper incrusted coke, so that the copper can be run out by a simple smelting process. Furthermore, the precipitation is so rapid that contamination by basic salts formed from the iron is slight, if any; and a very short launder may be used. The precipitate, moreover, has a higher percentage of metallic copper than that obtained by the use of iron alone and is coarser and more easily laundered.

For the purpose of giving a clear understanding of the process, a simple form of apparatus which may be utilized in carrying out the process is shown in the accompanying drawing which represents a sectional view of a box or launder containing the iron and coke, and provided with an inlet trough and outlet spout for the solutions.

The process may conveniently be carried on by allowing the mine waters or other solution to flow slowly through the receptacle $a$ which contains the iron and carbon, herein indicated as a promiscuously mixed or packed mass $b$, the solution flowing into the receptacle from the trough $c$, and being drawn out through the spout $d$, the trough at all times containing sufficient solution to cover the iron and coke. A large percentage of the copper is precipitated from the solution and remains in the receptacle in the form of metallic copper; the iron being practically consumed and the copper precipitated upon the coke, or freed from the iron upon which it has been precipitated. This copper-bearing coke can be placed in a blast furnace and the metallic copper run off in molten form, while the carbon is consumed. Some of the copper is also precipitated on the iron in metallic form, and can be shaken or scaled off.

Claims.

1. That improvement in the art or process of saving the metallic copper in weak solutions, such as mine waters, which consists in subjecting the solution to the action of iron and another electric conductor submerged in said solution, whereby the copper is precipitated therefrom.

2. That improvement in the art or process of extracting metallic copper from a solution which consists in immersing iron and carbon in the solution whereby the copper is precipitated, and subjecting the resulting mass to heat to extract the metallic copper in molten form.

3. The herein described process of extracting copper from solutions which consists in immersing in the solutions a number of small pieces of iron and carbon closely packed together, and treating the residue in a blast furnace.

In testimony whereof, I have signed my name to this specification in the presence of two subscribing witnesses.

ELMER E. SLAUGHTER.

Witnesses:
B. R. LANNEAU,
C. A. VAN DORN.

Copies of this patent may be obtained for five cents each, by addressing the "Commissioner of Patents, Washington, D. C."